United States Patent
Kalman

(10) Patent No.: US 8,225,191 B1
(45) Date of Patent: Jul. 17, 2012

(54) SYNCHRONIZING WEB BROWSERS

(75) Inventor: Benjamin Thomas Kalman, Chatswood NSW (AU)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/290,776

(22) Filed: Nov. 7, 2011

(51) Int. Cl.
*G06F 17/00* (2006.01)

(52) U.S. Cl. ........ 715/203; 715/201; 715/234; 707/620; 707/634

(58) Field of Classification Search .......... 715/201, 715/203, 234
See application file for complete search history.

(56) References Cited

U.S. PATENT DOCUMENTS

| | | | | |
|---|---|---|---|---|
| 6,151,622 | A * | 11/2000 | Fraenkel et al. | 709/205 |
| 6,738,789 | B2 * | 5/2004 | Multer et al. | 1/1 |
| 7,401,294 | B2 * | 7/2008 | Chang et al. | 715/733 |
| 2002/0083098 | A1 * | 6/2002 | Nakamura | 707/513 |
| 2002/0143859 | A1 * | 10/2002 | Kuki et al. | 709/203 |
| 2006/0259553 | A1 * | 11/2006 | Kawakita | 709/205 |
| 2007/0078903 | A1 * | 4/2007 | Saito | 707/200 |
| 2007/0283011 | A1 * | 12/2007 | Rakowski et al. | 709/225 |
| 2008/0168106 | A1 * | 7/2008 | Freedman | 715/700 |
| 2008/0168185 | A1 * | 7/2008 | Robbin et al. | 715/747 |
| 2008/0168391 | A1 * | 7/2008 | Robbin et al. | 715/810 |
| 2008/0201362 | A1 * | 8/2008 | Multer et al. | 707/103 R |
| 2008/0301562 | A1 * | 12/2008 | Berger et al. | 715/733 |
| 2010/0235321 | A1 * | 9/2010 | Shukla et al. | 707/610 |
| 2010/0333024 | A1 * | 12/2010 | Chan | 715/816 |

OTHER PUBLICATIONS

Martin Kaba, "Xmarks Tab Sync now opens Remote Tabs in any Web Browser", Apr. 29, 2010, http://www.kabatology.com/04/29/xmarks-tab-sync-now-opens-remote-tabs-in-any-web-browser, pp. 1-3.*
Enabling or disabling sync, Google Chrome, printed Nov. 7, 2011, 1 page.
Google Browser Sync, Wikipedia, printed Nov. 7, 2011, 2 pages.
Syncing across multiple computers, Google Chrome, printed Nov. 7, 2011, 1 page.
Browser Object Model, Wikipedia, printed Apr. 30, 2012, 1 page.
Document Object Model Events, World Wide Web, Nov. 13, 2000, 23 pages.
DOM events, Wikipedia, printed May 1, 2012, 20 pages.
JavaScript Tutorial, JavaScript Tutorial, printed Apr. 30, 2012, 3 pages.
The Browser Object Model, Java Script DHTML Tutorial, printed Apr. 30, 2012, 3 pages.
The Window Object, w3schools.com, printed Apr. 30, 2012, 2 pages.

* cited by examiner

*Primary Examiner* — Chau Nguyen
(74) *Attorney, Agent, or Firm* — Foley & Lardner LLP

(57) ABSTRACT

Systems and methods for synchronizing web browsers using synchronization windows are disclosed. A user action performed in a synchronization window, such as a popup window or tab of a web browser, may cause synchronization data to be generated. The synchronization data may be provided to one or more other devices having web browsers and cause the user action to be replicated on the one or more other devices. A synchronization server may be used to coordinate the synchronization process.

20 Claims, 4 Drawing Sheets

SYNCHRONIZING WEB BROWSERS

BACKGROUND

The present disclosure relates generally to synchronizing web browsers. The present disclosure more specifically relates to duplicating a user action performed in a web browser on a first device in a web browser on a second device.

A user may own or have access to a number of electronic devices. For example, a user may have access to a home computer, a work computer, a smartphone, a tablet PC, a set-top box for a television, etc. Each device may execute its own web browsing application independently from that of the other devices. For example, a user may maintain one set of configurations, bookmarks, and other web browser data on their smartphone and a different set on their home computer. A user action (e.g., opening or closing a website, opening or closing a window, etc.) performed on a first device is also independent of the other devices.

SUMMARY

Implementations of the systems and methods for synchronizing web browsers are described herein. One implementation is a computerized method for synchronizing web browsers. The method includes receiving, at a first electronic device, a request for a synchronization tab in a window of a web browser. The method also includes providing the requested synchronization tab to an electronic display. The method further includes receiving, at the first electronic device, a request for a non-synchronization tab in the window of the web browser. The method also includes providing the requested non-synchronization tab to the electronic display. The method additionally includes determining, at the first electronic device, the presence of a DOM event associated with the requested synchronization tab. The method yet further includes generating synchronization data configured to replicate the DOM event in a synchronization tab of a web browser on a second electronic device. The method also includes associating the synchronization data with a user profile and providing the synchronization data to a synchronization server.

Another implementation is a system for synchronizing web browsers. The system includes a processing circuit configured to receive a request for a synchronization tab in a window of a web browser and a request for a non-synchronization tab in the window of the web browser. The processing circuit is also configured to provide the requested synchronization tab and the requested non-synchronization tab to an electronic display. The processing circuit is configured to determine the presence of a DOM event associated with the requested synchronization tab. The processing circuit is also configured to generate synchronization data configured to replicate the DOM event in a synchronization tab of a web browser on a second electronic device. The processing circuit is configured to associate the synchronization data with a user profile and is configured to provide the synchronization data to a synchronization server.

A further implementation is a computer-readable media having instructions stored therein, the instructions being executable by one or more processors to cause the one or more processors to perform operations. The operations include receiving a request for a synchronization tab in a window of a web browser and providing the requested synchronization tab to an electronic display. The operations also include receiving a request for a non-synchronization tab in the window of the web browser and providing the requested non-synchronization tab to the electronic display. The operations further include determining the presence of a DOM event associated with the requested synchronization tab. The operations also include generating synchronization data configured to replicate the DOM event in a synchronization tab of a web browser on a second electronic device. The operations additionally include associating the synchronization data with a user profile and providing the synchronization data to a synchronization server.

These implementations are mentioned not to limit or define the scope of this disclosure, but to provide examples of implementations to aid in understanding thereof.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

According to some aspects of the present disclosure, web browsers running on two or more electronic devices may be synchronized. In traditional systems, web browsers on different devices operate independently from one another. For example, a college student may use a library computer to do research and later return to his dorm room and continue researching using his laptop computer. In a traditional scenario, the web browser on the laptop computer is entirely autonomous of that of the library computer, meaning that the student has to retrace his research trail before continuing his research using the laptop computer.

In various implementations described herein, a browser session may be synchronized across web browsers on different devices. A user browsing the Internet on a first device may designate that a window or tab of the web browser is to be shared on one or more other devices. Using the example above, the college student may open a "synchronization window," while performing research using the library computer. As used throughout this disclosure, the term "window" is used to refer to any displayed area or sub-area on an electronic device. For example, a window may be a tab, frame, box, etc., of a displayed web browser. A synchronization window may be configured to cause user actions performed within the window to be automatically recreated on one or more other devices. For example, if the student opens a particular webpage on the library computer in a synchronization window, the student's laptop may automatically open the same webpage in another synchronization window. The college student is thus able to seamlessly continue their research using their laptop computer, since actions performed in a synchronization window on the library computer are replicated on the laptop computer.

Web browsers utilizing synchronization windows afford a user greater control over the synchronization process. In some cases, a user may not wish to share the entirety of their browsing session. For example, the college student doing research on a library computer may periodically refresh a webpage to view the latest score of a football game, in addition to browsing a number of research-related webpages. If the college student only wishes to recreate their browsing session related to their research, one or more synchronization windows can be used to selectively control which user actions are replicated on the laptop computer. In this way, clutter can be avoided on the second device by allowing the user to specify which portions of their browsing session are to be synchronized.

Figure 1:
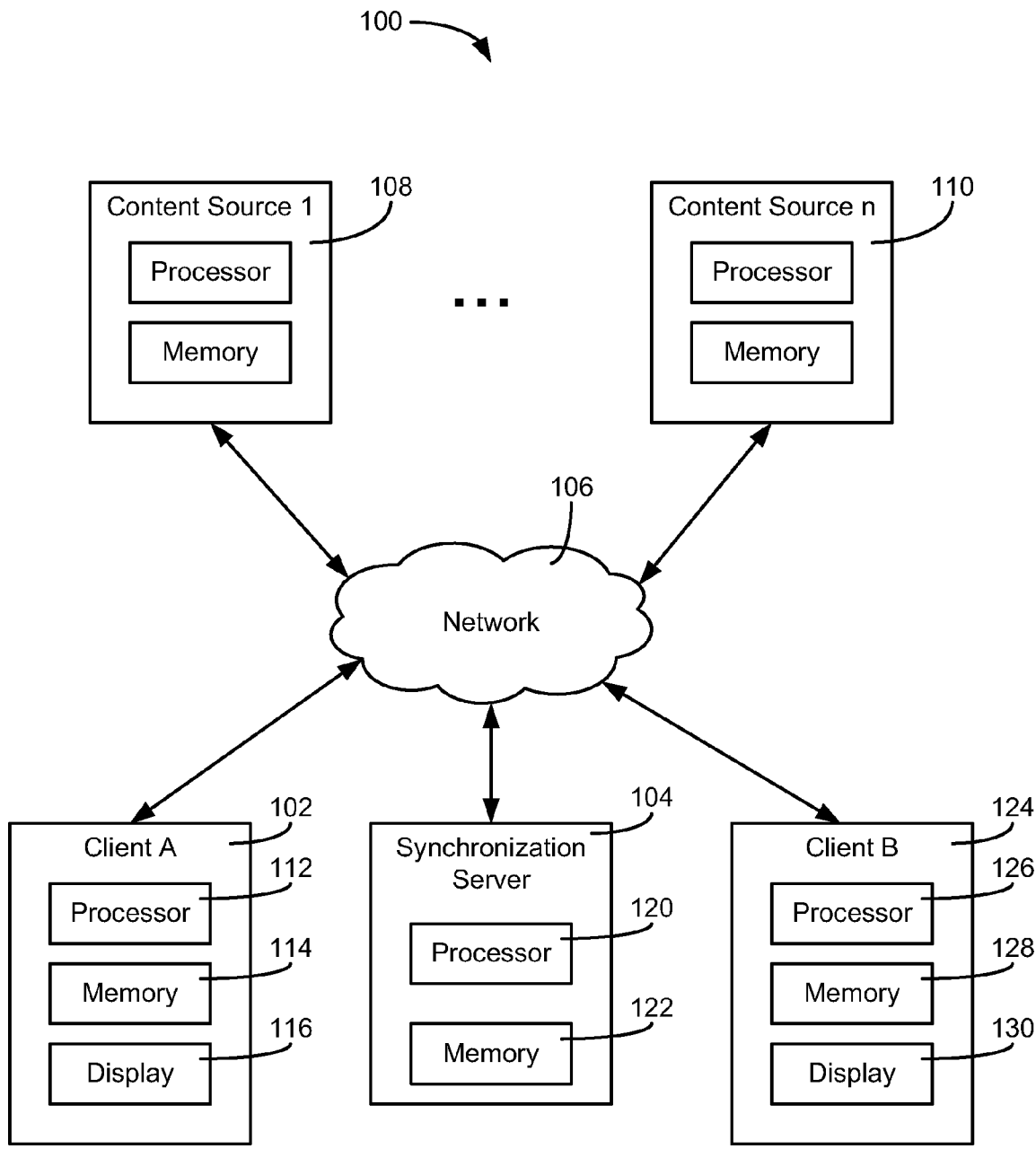
FIG. 1 is a block diagram of a computer system in accordance with a described implementation.

Referring to FIG. 1, a block diagram of a computer system 100 in accordance with a described implementation is shown. System 100 includes an electronic device 102 which communicates with other computing devices via a network 106. Electronic device 102 executes a web browser to retrieve content from other devices over network 106. For example, electronic device 102 may communicate with one or more content sources ranging from a first content source 108 up to an nth content source 110. Content sources 108, 110 may provide webpages and/or other content (e.g., text documents, PDF files, and other forms of electronic documents) to electronic device 102. System 100 may also include one or more other electronic devices that also execute web browsers, such as electronic device 124. In various implementations, the web browser of electronic device 102 and the web browser of electronic device 124 may be synchronized such that a user action performed at electronic device 102 is automatically replicated on electronic device 124. In some implementations, a synchronization server 104 may be used to facilitate the synchronization process between devices. For example, a user may register electronic devices 102, 124 with synchronization server 104 as devices to be synchronized. A user action performed in a synchronization window on either of electronic devices 102, 124 may be sent to synchronization server 104, which recreates the user action on other electronic devices registered with synchronization server 104.

Network 106 may be any form of computer network that relays information between electronic device 102, synchronization server 104, and content sources 108, 110. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, electronic device 102 may communicate wirelessly (e.g., via WiFi, cellular, radar, etc.) with a transceiver that is hardwired (e.g., via a fiber optic cable, a CAT5 cable, etc.) to other computing devices in network 106.

Electronic devices 102, 124 may be of any number of different types of user electronic devices configured to communicate via network 106 (e.g., a laptop computer, a desktop computer, a tablet computer, a smartphone, a digital video recorder, a set-top box for a television, a video game console, combinations thereof, etc.). Electronic device 102 is shown to include a processor 112 and a memory 114, i.e., a processing circuit. Similarly, electronic device 124 is also shown to include a processing circuit that includes a processor 126 and a memory 128. Memories 114, 128 stores machine instructions that, when executed by processors 112, 126, respectively, cause processors 112, 126 to perform one or more of the operations described herein. Processors 112, 126 may include a microprocessor, ASIC, FPGA, etc., or combinations thereof. Memories 114, 128 may include, but are not limited to, electronic, optical, magnetic, or any other storage or transmission device capable of providing processors 112, 126 with program instructions. Memories 114, 128 may include a floppy disk, CD-ROM, DVD, magnetic disk, memory chip, ASIC, FPGA, ROM, RAM, EEPROM, EPROM, flash memory, optical media, or any other suitable memory from which processors 112, 126 can read instructions. The instructions may include code from any suitable computer programming language such as, but not limited to, C, C++, C#, Java, JavaScript, Perl, Python and Visual Basic.

Electronic devices 102, 124 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of electronic devices 102, 124 (e.g., a built-in display, microphone, etc.) or external to the housing of electronic devices 102, 124 (e.g., a monitor connected to electronic device 102, a speaker connected to electronic device 124, etc.), according to various implementations. For example, electronic device 102 may include an electronic display 116, which visually displays webpages and other electronic documents using data received from content sources 108, 110, and/or synchronization server 104. Similarly, electronic device 124 may include an electronic display 130.

Content sources 108, 110 are electronic devices connected to network 106 that may provide content to electronic devices 102, 124. For example, content sources 108, 110 may be computer servers (e.g., FTP servers, file sharing servers, web servers, etc.) or other devices that include processing circuits. Content may include, but is not limited to, webpage data, a text file, a spreadsheet, images, and other forms of electronic documents. Similarly, synchronization server 104 may include a processing circuit that includes a processor 120 and a memory 122 configured to receive an indication of a user action at one electronic device and to provide an indication of the user action to one or more other electronic devices. In some implementations, synchronization server 104 may store user profile information and information about devices associated with the user profile. For example, a user operating electronic device 102 may register electronic devices 102, 124 with their user profile on synchronization server 104. When the user logs into their user profile on one of electronic devices 102, 124, synchronization server 104 may use this information to synchronize browser windows across the registered electronic devices.

In some implementations, synchronization server 104 may be configured to synchronize browser configurations such as bookmarks, a default language, a default font, etc., and other browser configurations across devices associated with a user profile. For example, a user may bookmark a particular webpage on electronic device 102. If electronic devices 102, 124 are associated with the user's profile on synchronization server 104, data may be transmitted from electronic device 102 to synchronization server 104 and on to electronic device 124 such that the bookmark also appears in the web browser running on electronic device 124. Other examples include fonts, toolbars, resolutions, etc., that can be synchronized across electronic devices 102, 124. An electronic device (e.g., electronic devices 102, 124) may be used to specify which other device or devices are to be synchronized. For example, electronic device 102 may receive a selection that electronic device 124 is to be synchronized to it and provide the selection to synchronization server 104. In another example, a selection that electronic device 124 is to be synchronized to electronic device 102 may be used by electronic device 102 to send synchronization data directly to electronic device 124.

User actions that may be synchronized across electronic devices may include, but are not limited to, opening a window, closing a window, opening a webpage or file, closing a webpage or file, navigating to a particular URL, scrolling to a location within a document, playing a stream of media content, running a Javascript element, or any other action associated with operating a web browser. According to some implementations, the user action may be a Document Object Model (DOM) event. DOM events may include standardized DOM events promulgated by the World Wide Web Consortium (W3C), the primary standards organization for the Internet, and/or may include browser-specific DOM events. In general, DOM events allow webpages to include code that is conditioned on the detection of a certain event. In some implementations, DOM events may include receiving an input from an interface device (e.g., a mouse or other pointing device, a keyboard, a touchscreen display, etc.). For example, a DOM event may correspond to clicking on a webpage object using a mouse, pressing an up arrow on a keypad, touching a touchscreen display, etc. DOM events may also include actions such as loading or unloading a webpage, resizing a window of the web browser, performing a clipboard action (e.g., selecting an object, copying an object, pasting an object, etc.), dragging data within the webpage or between the web browser and another application, opening or closing a window, detecting an error, or other events related to the operation of a web browser.

In some implementations, synchronization server 104 may utilize a "push" strategy. For example, a user may perform an action within a synchronization window of a web browser on electronic device 102. In response, electronic device 102 may provide synchronization data to synchronization server 104 that includes an indication of the user's action. In a push implementation, synchronization server 104 may provide synchronization data to electronic device 124 without first receiving a request for the data from electronic device 124. In some implementations, synchronization server 104 may push synchronization data to electronic device 124 in real-time or near real-time, allowing one or more synchronization windows on electronic device 124 to be continuously updated based on user actions in a corresponding synchronization window on electronic device 102.

In some implementations, synchronization server 104 may utilize a "pull" strategy. Similar to push implementations, electronic device 102 may provide synchronization data to synchronization server 104 that includes an indication of a user's action in a synchronization window on electronic device 102. In a pull implementation, however, synchronization server 104 may provide synchronization data to electronic device 124, in response to receiving a request for the data from electronic device 124. In some implementations, electronic device 124 may request synchronization data from synchronization server 104 when electronic device 124 is in use. For example, electronic device 124 may not request synchronization data from synchronization server 104 when electronic device 124 is idle, asleep, in a low power mode, in a hibernation mode, or its screensaver is active. In another example, electronic device 124 may not request synchronization data from synchronization server 104 unless a synchronization window is currently displayed on display 130 or the web browser is active (e.g., launched as an application on the device). In another example, electronic device 124 may prompt a user via display 130 to accept before retrieving synchronization data. In a further example, electronic device 124 may not request synchronization data from synchronization server 104 until a user provides security credentials to unlock a synchronization window (e.g., a login, a password, a retinal scan, a fingerprint scan, etc.). In such implementations, network bandwidth can be conserved by only transmitting synchronization data to electronic device 124 when requested.

In some implementations, synchronization server 104 may be excluded from some or all of the synchronization process. For example, electronic device 102 may provide synchronization data directly to electronic device 124 over network 106. In such implementations, electronic device 102 may store information about the devices to be synchronized in memory 114. In some cases, electronic device 102 may prompt a user to identify one or more devices that are to be synchronized with electronic device 102, such as electronic device 124. Identification of another electronic device, for example, may include a name of the device, login information for the device, a network address (e.g., a URL, an IP address, etc.) for the device, the type of device, or any other information that may be used by electronic device 102 to determine how synchronization data is to be sent to the device over network 106.

Figure 2:
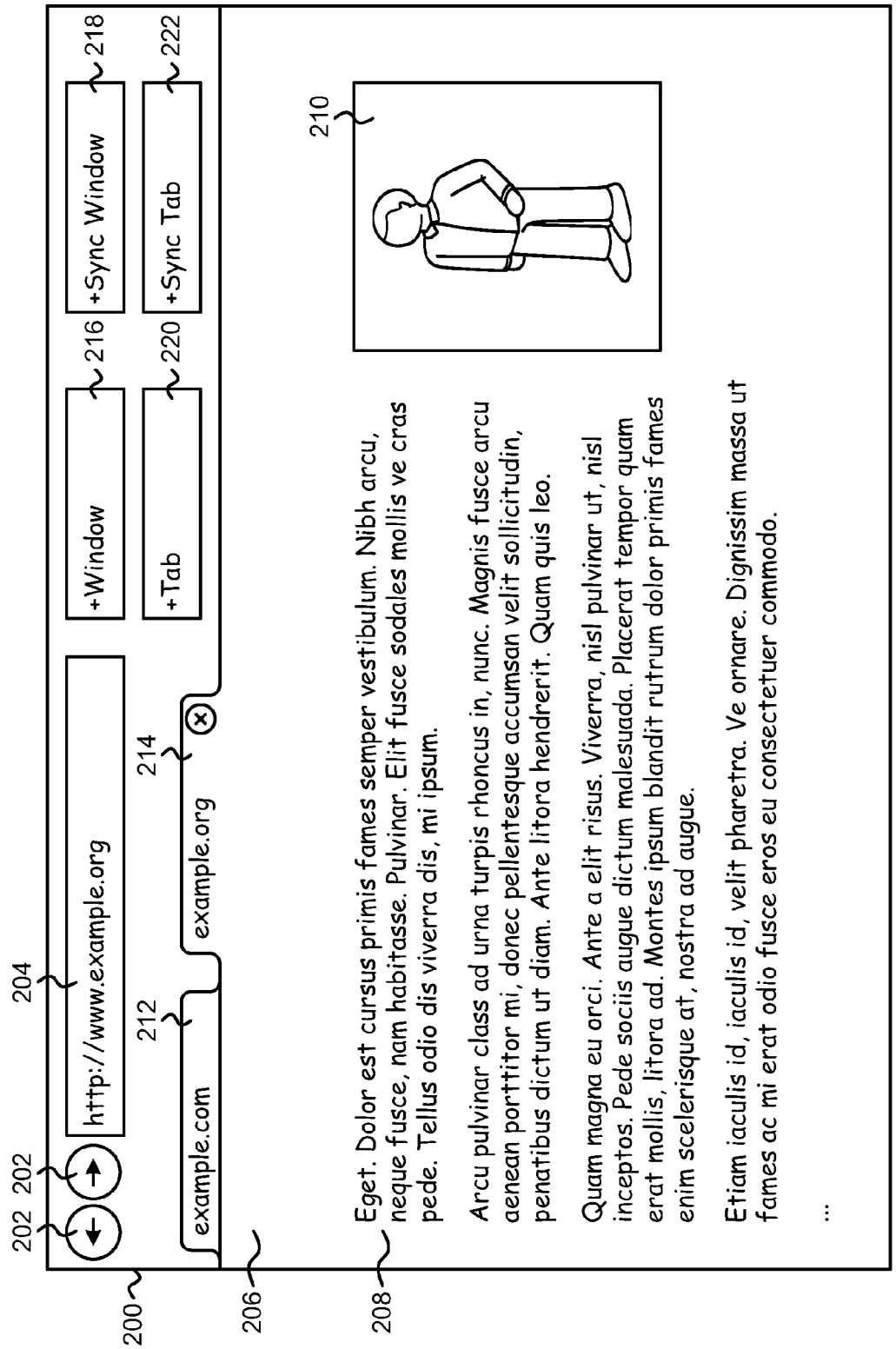
FIG. 2 is an illustration of an example display of a web browser.

Referring now to FIG. 2, an example display 200 is shown. Display 200 is in electronic communication with one or more processors that cause visual indicia to be displayed by display 200. Display 200 may be located inside or outside of the same housing as that of the one or more processors. For example, display 200 may be external to a desktop computer (e.g., display 200 is a monitor), may be a television set, or may be any other stand-alone form of electronic display. In another example, display 200 may be internal to a laptop computer, mobile device, or other computing device having an integrated display.

As shown in FIG. 2, the one or more processors in communication with display 200 may execute a software application, such as a web browser (e.g., display 200 is part of an electronic device configured to communicate over a network). The web browser operates by receiving input of a uniform resource identifier (URI) into a field 204, such as a web address, from an input device (e.g., a pointing device, a keyboard, a touchscreen, etc.). In response, the one or more processors executing the web browser may request data over a network (e.g., the Internet, an intranet, etc.) from a content source corresponding to the URI. The content source may provide webpage data and/or other data to the client device and used to cause visual indicia to be displayed by display 200.

In general, webpage data may include text, hyperlinks, layout information, and other data that is used to provide the framework for the visual layout of displayed webpage 206. In some implementations, webpage data may be one or more files in a markup language, such as the hypertext markup language (HTML), extensible HTML (XHTML), extensible markup language (XML), or any other markup language. For example, the webpage data in FIG. 2 may include a file, "example.html" provided by the website, "www.example.org." The webpage data may include data that specifies where indicia appears on webpage 206, such as text 208, image 210, or other visual objects. In some implementations, the webpage data may also include additional URI information used by the client device to retrieve additional indicia displayed on webpage 206. For example, the file, "example.html," may include URI information for the network location of image 210.

The web browser providing display data to display 200 may include a number of navigational controls associated with webpage 206. For example, the web browser may include the ability to go back or forward to other webpages using inputs 202 (e.g., a back button, a forward button, etc.). In various implementations, inputs 202 may retrieve webpage data again from a content source over a network or may retrieve previously displayed webpage data from a local cache.

The web browser may be configured to display webpages in a number of different windows (e.g., as tabs, pop-ups, or other visual areas on display 200). For example, a first webpage, e.g., http://www.example.com, may be displayed in tab 212 by the web browser. A second webpage, e.g., webpage 206, may also be displayed in tab 214. The web browser may be configured to receive a request for a new window via input 216 or a new tab via input 220. For example, selection of input 220 (e.g., via a touchscreen display, a pointing device, etc.) may cause the web browser to display another tab, in addition to displaying tabs 212, 214. Opened windows may also be closed. For example, tab 214 may be closed, thereby displaying the contents of tab 212.

In various implementations, the web browser may include one or more inputs to request that a window be synchronized with one or more other electronic devices. For example, the web browser displayed by display 200 may include input 218 to request a new synchronization window. In response to selection of input 218, a new window may be displayed on display 200. Such a synchronization window may be configured to provide synchronization data (e.g., data regarding the browsing state of the synchronization window, user actions performed within the window, etc.) to a synchronization server or directly to another electronic device. In another example, the web browser displayed by display 200 may include input 222 to request a new synchronization tab. In response to selection of input 222, a new tab may be displayed adjacent to tab 214 on display 200. In various implementations, the web browser may include one or more inputs configured to designate a currently displayed window, tab, etc., as a synchronization window, or vice-versa. In some implementations, display 200 may display one or more selectable inputs through which the user is able to select one or more devices to be synchronized with the synchronization window. For example, display 200 may display a pop-up window that allows the user to select their home computer, tablet PC, smartphone, smart television, etc. The devices available to be synchronized may be stored locally to the device associated with display 200 or registered in a synchronization server, according to various implementations.

Figure 3:
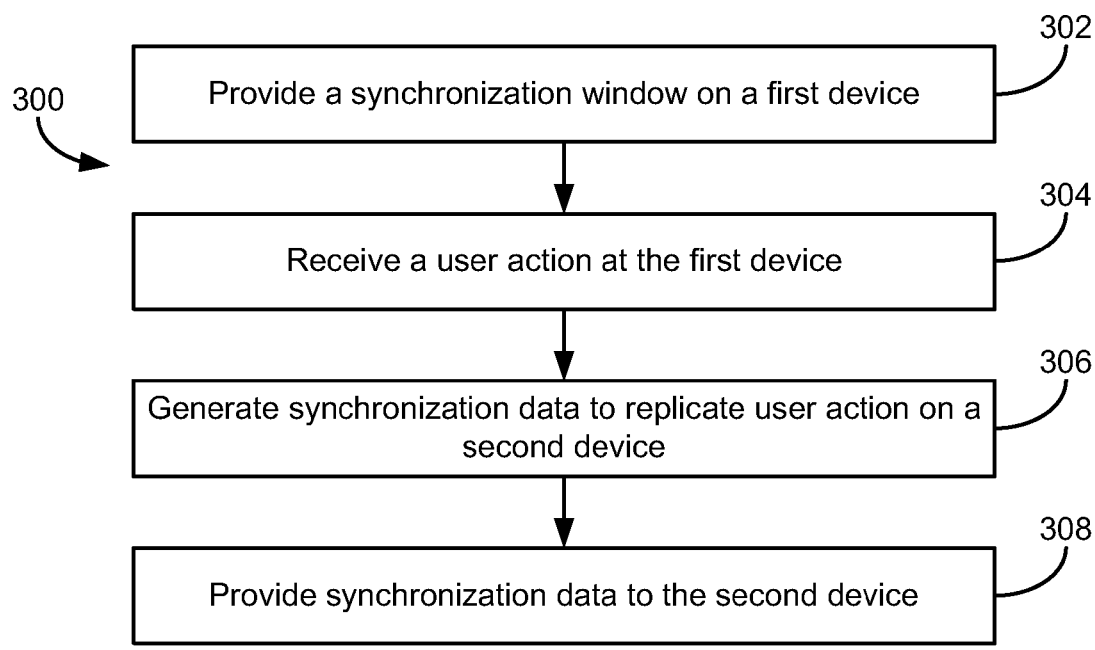
FIG. 3 is an example process for synchronizing web browsers.

FIG. 3 is an example process 300 for synchronizing web browsers. In some implementations, a system that includes two or more electronic devices may utilize process 300 to provide seamless synchronization between a web browser running on a first device and a web browser on a second device.

Process 300 includes providing a synchronization window on a first device (block 302). In general, a synchronization window may be displayed by a web browser as some or all of an electronic display. For example, a synchronization window may be displayed on the entirety of the electronic display or may be displayed as a subarea of the display, such as a tab or popup window within a running application on the device. In some implementations, the synchronization window may be provided to the display in response to receiving a request for a new synchronization window. In some implementations, the synchronization window may be provided in response to receiving a request to convert an existing window into a synchronization window. For example, a user viewing a webpage in a standard window may opt to convert the current window into a synchronization window.

Process 300 includes receiving a user action at the first device (block 304). A user action may include, but is not limited to, opening or closing an electronic document (e.g., a webpage, a text file, a media file, etc.), requesting an electronic document over a network, providing data to a remote device, opening or closing a displayed window, or any other action associated with a web browser. For example, a user at the first device may request a webpage by selecting a hyperlink on a currently displayed webpage. In another example, a user may opt to close a synchronization window. In various implementations, a user action may be a DOM event detected by the web browser.

Process 300 includes generating synchronization data to replicate a user action at a second device (block 306). Synchronization data may include, for example, an indication of the user's action (e.g., opening a document, closing a document, selecting a hyperlink, etc.), one or more network addresses associated with the action (e.g., a URL, an IP address, etc.), or any other data indicative of the actions performed in a synchronization window. In some implementations, synchronization data may be a digital image of the display data associated with the synchronization window. For example, a user may visit a particular webpage in a synchronization tab on the first device. In such a case, the synchronization data may be a digital image of the particular webpage, as displayed in the synchronization tab. Such an implementation may be used when the webpage utilizes state information or security measures. For example, a webpage may rely on cookies, POST data submitted by the first device, Javascript/HTML state, encryption, login information, or other types of data used to control whether the particular webpage is displayed and what information is contained in the webpage. In one example, a user may access a webpage containing their online bank statement. Such a webpage may be encrypted and only accessible after a successful login. In such a case, the synchronization window may provide an image of the resulting webpage as synchronization data, instead of the URL of the webpage or other data.

In some implementations, synchronization data may be configured to provide a warning or alert at a second device. For example, a secure webpage being viewed in a synchronization window on a first device may cause a second device to display a warning or alert before the secure webpage is displayed on the second device (e.g., by opening the webpage on the second device, by showing an image of the webpage displayed on the first device, etc.). In some cases, the second device may be prevented from displaying the secure webpage outright (e.g., the secure webpage is never displayed on the second device). In other implementations, the warning or alert may be provided on the first device before the synchronization data is generated.

The generated synchronization data may include a command to replicate the user action on a second device. For example, the synchronization data may be provided directly to a second device and include an instruction to open a synchronization window on the second device. In another example, the synchronization data may include an instruction for the second device to open a specified URL in a synchronization window.

In some implementations, the synchronization data may be encrypted. For example, the synchronization data may be provided from the first device to a synchronization server that stores the synchronization data as one or more encrypted files. Encrypted synchronization data may be decrypted by verifying credentials of a user profile associated with the synchronization data. In one example, a user operating the first device may provide profile information to a synchronization server to log into their profile. In response to receiving a user action associated with a synchronization window on the first device, synchronization data may be sent from the first device to the synchronization server and stored in an encrypted form. Decryption of the synchronization data may then require the user to provide the same credentials from the first device or another electronic device to the synchronization server.

Process 300 includes providing synchronization data to the second device (block 308). The synchronization data may be provided to the second device either directly or indirectly by the first device, according to various implementations. For example, the synchronization data may be sent first to a synchronization server. The synchronization server may utilize a push, pull, or a hybrid methodology to then provide the synchronization data to the second device. The synchronization server may store an association between a user profile and a network address or other identifier of the second device. Such an association may be used by the synchronization server to determine which device or devices are to receive the synchronization data. In some cases, the synchronization server may adjust the synchronization data before sending the synchronization data to the second device. For example, the synchronization server may add a command or other instruction to the synchronization data received from the first device, before sending the synchronization data to the second device (e.g., the synchronization server receives a URL from the first device and commands the second device to open the URL).

In some implementations, the synchronization data may be provided directly from the first electronic device to the second electronic device. For example, the first electronic device may send synchronization data in real-time or near real-time to the second device when an action is performed in a synchronization window on the first device. In another implementation, the first electronic device may store the synchronization data and provide it to the second device, in response to receiving a request for the synchronization data from the second device. For example, a user may perform an Internet search in a synchronization window on the first device. In response, the first device may store synchronization data associated with the search. The user may then utilize the second device, which requests the synchronization data from the first device to display the same Internet search.

Figure 4:
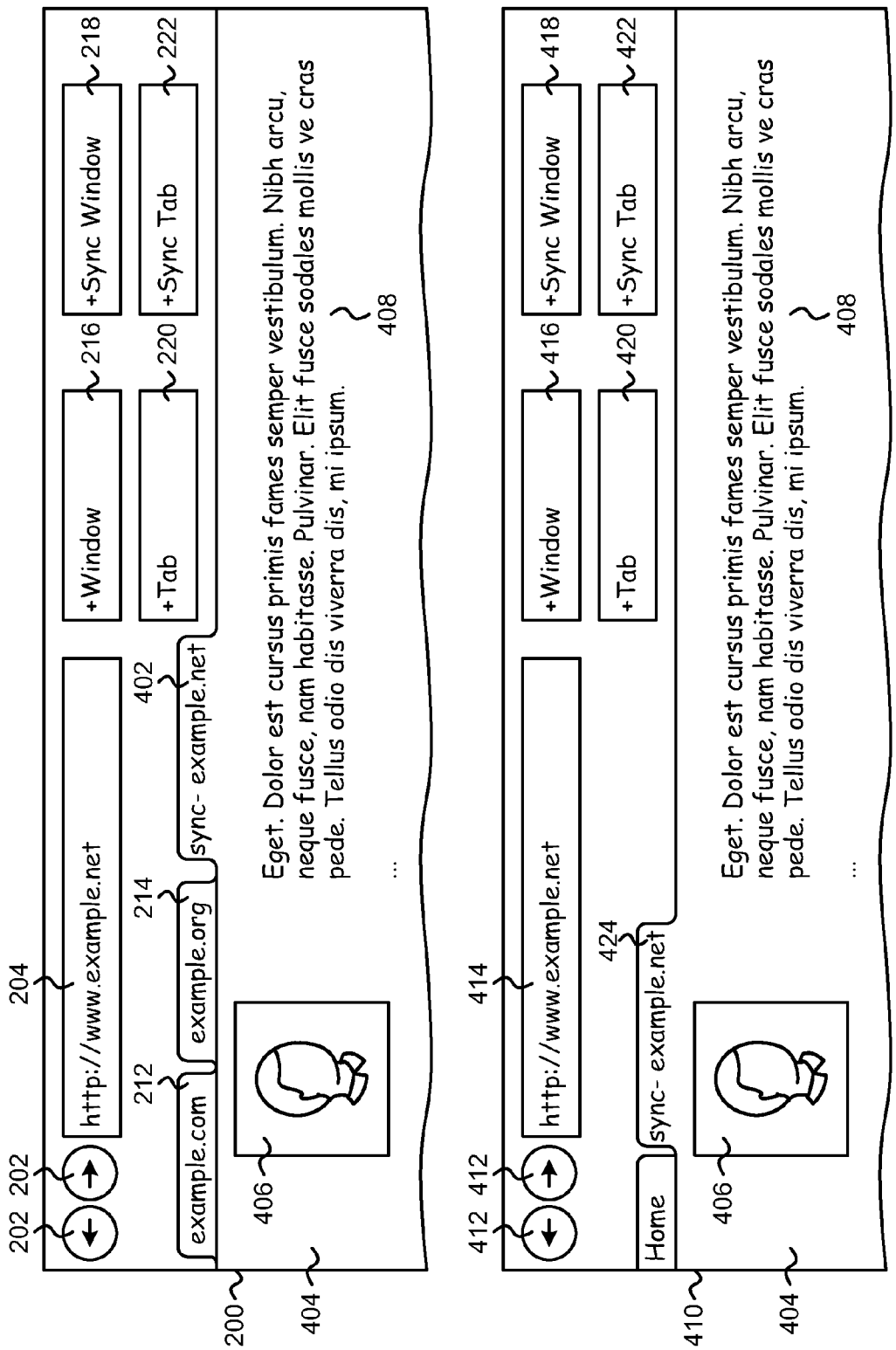
FIG. 4 is an illustration of example displays of synchronized web browsers.

FIG. 4 shows an illustration of example displays 200, 410 of synchronized web browsers. Displays 200, 410 may be part of separate devices (e.g., display 200 is part of a first electronic device and display 410 is part of a second electronic device). The devices associated with display 200, 410 may be connected via a communications network (e.g., the Internet, a wireless network, a LAN, etc.). As shown, the web browser displayed by display 200 includes a synchronization tab 402. Synchronization tab 402 may be displayed, for example, in response to a selection of input 222. In another example, a displayed tab may be converted into a synchronization tab or vice-versa via another selectable input area on display 200 (e.g., a button, a checkbox, etc., in the displayed web browser). For example, tabs 212, 214 may be non-synchronization tabs (e.g., tabs 212, 214 are not configured to cause an associated action to be replicated on the electronic device of display 410), but may be converted into synchronization tabs, according to some implementations.

Synchronization tab 402 is configured to display a webpage or other electronic document. For example, synchronization tab 402 may display a webpage 404 retrieved from the URI entered into field 204 of the web browser (e.g., http://www.example.net). Webpage 404 may include various indicia, such as an image 406 and/or text 408. The web browser displayed on display 200 may be configured to generate synchronization data when a user action associated with synchronization tab 402 is performed. For example, selection of input 222 to display synchronization tab 402 may cause synchronization data to be generated that indicates that a synchronization tab has been opened (e.g., a user action has been received). In another example, navigation to webpage 404 in synchronization tab 402 may cause synchronization data to be generated (e.g., another user action has been received). Synchronization data generated in this way may be provided, either directly or indirectly (e.g., via a synchronization server), to one or more other electronic devices, such as the electronic device that includes display 410.

Display 410 is shown to display a web browser (e.g., an application running on the second device) having field 414 for retrieving webpage or document data using an inputted URI. The web browser displayed on display 410 may include inputs 412 for navigating between retrieved webpages or documents. The web browser displayed on display 410 may include any number of inputs 416, 418, 420, 422 for opening new windows or tabs in either regular mode or synchronization mode. For example, input 416 may be selected to open a new browser window. In some implementations, the web browser displayed by display 410 may include one or more inputs to switch an open window or tab between a synchronization mode and a normal mode.

According to various implementations, the web browser displayed on display 410 may be configured to utilize a push, pull, or a hybrid approach to synchronization. For example, the web browser displayed on display 410 may request synchronization data from a remote device (e.g., a synchronization server, the device associated with display 200, etc.) when the web browser is launched. The web browser displayed on display 410 may be configured to request synchronization data when the device associated with display is active. In another example, the web browser displayed on display 410 may be configured to automatically receive synchronization data without first requesting the data. In some implementations, a hybrid approach may be utilized, wherein certain types of user actions are synchronized automatically and others require first receiving a user request to perform synchronization.

In some implementations, the device associated with display 410 may be configured to only request synchronization data (e.g., as part of a pull or hybrid strategy) when certain system conditions are met. In one example, the device associated with display 410 may be configured to retrieve synchronization data when the device is not idle, display 410 is not locked, or based on any other system condition indicative of the device not being in use by a user. In one implementation, the device associated with display 410 may be configured to only retrieve synchronization data when a synchronization window is being displayed. For example, the device associated with display 410 may only request synchronization data when synchronization tab 424 is opened via input 422. If synchronization data is available, synchronization tab 424 may be used to display the corresponding webpage.

As shown, synchronization data generated by opening webpage 404 in synchronization tab 402 may be provided to the device associated with display 410. In response to receiving the synchronization data, the device associated with display 410 replicates the user action. For example, synchronization data may be generated when synchronization tab 402 is opened and sent to the device associated with display 410. In response to receiving the synchronization data, the device associated with display 410 may cause synchronization tab 424 to be displayed. In another example, synchronization data may be generated when webpage 404 is opened in synchronization tab 402 and sent to the device associated with display 410. In response to receiving the synchronization data, the device associated with display 410 may cause webpage 404 to be retrieved and displayed on display 410.

According to various implementations, synchronization may be bidirectional or unidirectional. Synchronization tab 424 may be configured to both receive synchronization data and to generate synchronization data, in a bidirectional manner. For example, synchronization tab 424 may load webpage 404, in response to receiving synchronization data generated by the device associated with display 200. A subsequent user action performed in synchronization tab 424 (e.g., a user traverses a hyperlink, a user enters a new URL into field 414, etc.) may similarly cause new synchronization data to be generated by the device associated with display 410. The new synchronization data may then be provided, for example, to the device associated with display 200 and cause the device to replicate the user action. In unidirectional implementations, however, synchronization tab 424 may be configured only to receive synchronization data (e.g., subsequent user actions performed in synchronization tab 424 may not cause synchronization data to be generated).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. For example, while certain implementations are described herein with respect to routing data in a data network, the methodologies described could also be applied to other areas, such as determining the best routes of a map that may be traveled by a person or vehicle. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computerized method for synchronizing web browsers comprising:

receiving, at a first electronic device, a request for a synchronization tab in a window of a web browser;

providing the requested synchronization tab to an electronic display, the synchronization tab being configured to display a webpage on the electronic display;

receiving, at the first electronic device, a request for a non-synchronization tab in the window of the web browser;

providing the requested non-synchronization tab to the electronic display;

determining, at the first electronic device, the presence of a DOM event associated with the webpage being displayed in the requested synchronization tab, the presence of the DOM event being determined by an event listener registered on a node in the document object model of the webpage;

generating synchronization data configured to replicate the DOM event in a synchronization tab of a web browser on a second electronic device;

associating the synchronization data with a user profile; and providing the synchronization data to a synchronization server.

2. The method of claim 1, wherein the synchronization server is configured to provide the synchronization data to the second electronic device in response to receiving the synchronization data.

3. The method of claim 1, wherein the synchronization server is configured to provide the synchronization data to the second electronic device in response to receiving a request for synchronization data from the second electronic device.

4. The method of claim 1, further comprising:
receiving, at the first electronic device, a configuration for the web browser of the first electronic device, wherein the synchronization data is also configured to replicate the configuration in the web browser on the second electronic device, wherein the configuration comprises at least one of a bookmark, a default language, or a default font.

5. The method of claim 1, wherein the first electronic device comprises a mobile device.

6. The method of claim 1, further comprising:
providing an alert to the electronic display based in part on whether the DOM event corresponds to opening a secure webpage in the synchronization tab.

7. The method of claim 1, further comprising:
receiving, at the first electronic device, a request to stop synchronizing the synchronization tab in the web browser on the first device.

8. A system for synchronizing web browsers comprising a processing circuit configured to receive a request for a synchronization tab in a window of a web browser and a request for a non-synchronization tab in the window of the web browser, the synchronization tab being configured to display a webpage on the electronic display, wherein the processing circuit is configured to provide the requested synchronization tab and the requested non-synchronization tab to an electronic display, wherein the processing circuit is configured to determine the presence of a DOM event associated with the webpage being displayed in the requested synchronization tab, the presence of the DOM event being determined by an event listener registered on a node in the document object model of the webpage, wherein the processing circuit is configured to generate synchronization data configured to replicate the DOM event in a synchronization tab of a web browser on a second electronic device, wherein the processing circuit is configured to associate the synchronization data with a user profile, and wherein the processing circuit is configured to provide the synchronization data to a synchronization server.

9. The system of claim 8, wherein the synchronization server is configured to provide the synchronization data to the second electronic device in response to receiving the synchronization data.

10. The system of claim 8, wherein the synchronization server is configured to provide the synchronization data to the second electronic device in response to receiving a request for synchronization data from the second electronic device.

11. The system of claim 8, wherein the processing circuit is configured to receive a configuration for the web browser and to associate the configuration with the user profile, wherein the synchronization data is also configured to replicate the configuration in the web browser on the second electronic device, wherein the configuration comprises at least one of a bookmark, a default language, or a default font.

12. The system of claim 8, wherein the processing circuit is configured to receive a selection of one or more devices to be synchronized, wherein the processing circuit is configured to associate the selection of one or more devices to be synchronized with the user profile, wherein processing circuit is configured to provide the selection of the one or more devices to be synchronized to the synchronization server, and wherein the selection of one or more devices to be synchronized comprises a selection of the second electronic device.

13. The system of claim 8, wherein the processing circuit is configured to provide an alert to the electronic display based in part on whether the DOM event corresponds to opening a secure webpage in the synchronization tab.

14. The system of claim 8, wherein the processing circuit is configured to receive a request to stop synchronizing the synchronization tab in the web browser.

15. A computer storage medium having instructions stored therein, the instructions being executable by one or more processors to cause the one or more processors to perform operations comprising:
receiving a request for a synchronization tab in a window of a web browser;
providing the requested synchronization tab to an electronic display, the synchronization tab being configured to display a webpage on the electronic display;
receiving a request for a non-synchronization tab in the window of the web browser;
providing the requested non-synchronization tab to the electronic display;
determining the presence of a DOM event associated with the webpage being displayed in the requested synchronization tab, the presence of the DOM event being determined by an event listener registered on a node in the document object model of the webpage;
generating synchronization data configured to replicate the DOM event in a synchronization tab of a web browser on a second electronic device;
associating the synchronization data with a user profile; and
providing the synchronization data to a synchronization server.

16. The computer storage medium of claim 15, wherein the synchronization server is configured to provide the synchronization data to the second electronic device in response to receiving the synchronization data.

17. The computer storage medium of claim 15, wherein the synchronization server is configured to provide the synchronization data to the second electronic device in response to receiving a request for synchronization data from the second electronic device.

18. The computer storage medium of claim 15, wherein the operations further comprise:
receiving a configuration for the web browser of the first electronic device, wherein the synchronization data is also configured to replicate the configuration in the web browser on the second electronic device, wherein the configuration comprises at least one of a bookmark, a default language, or a default font.

19. The computer storage medium of claim 15, wherein the second electronic device comprises a mobile device.

20. The computer storage medium of claim 15, wherein the operations further comprise:
providing an alert to the electronic display based in part on whether the DOM event corresponds to opening a secure webpage in the synchronization tab.

* * * * *